Jan. 26, 1954

O. H. WINN

AUTOMATIC FREQUENCY CONTROL CIRCUITS FOR SUPERHETERODYNE MICROWAVE RECEIVERS

Filed Feb. 2, 1951

2,667,636

Inventor:
Oliver H. Winn,
by Merton D. Moore
His Attorney.

Patented Jan. 26, 1954

2,667,636

UNITED STATES PATENT OFFICE 2,667,636

AUTOMATIC FREQUENCY CONTROL CIRCUITS FOR SUPERHETERODYNE MICROWAVE RECEIVERS

Oliver H. Winn, Baldwinsville, N. Y., assignor to General Electric Company, a corporation of New York Application February 2, 1951, Serial No. 209,154

3 Claims. (Cl. 343—17.1)

My invention relates to superheterodyne radio receivers adapted for receiving microwave signals having frequencies of the order of 3000 megacycles or higher, and particularly relates to automatic frequency control (A. F. C.) systems for stabilizing the operation of such receivers. Although not limited thereto, my invention has particular utility as applied to pulse radar receivers.

In a superheterodyne radio receiver operating at such extremely high frequencies, it is difficult to stabilize the local oscillator frequency so that the difference between this frequency and the incoming signal frequency remains constant and equal to the desired frequency to which the intermediate frequency amplifier of the receiver is fixedly tuned. Such microwave receivers commonly employ a local oscillator tube of the velocity-modulation, or cavity, type (for example, a reflex klystron). The frequency of such a tube can be varied to some extent by varying the potential of its reflector electrode. Therefore, the A. F. C. control voltage is usually a unidirectional potential derived from this difference frequency and is applied to the reflector electrode. The polarity and magnitude of this control voltage are adjusted to vary the oscillator frequency so as to compensate for any deviations from this difference frequency.

In pulse receivers employed in microwave radar systems, it has been common practice to mix, or heterodyne, a fraction of the transmitted signal energy with a fraction of the local oscillator energy in a separate detector, thereby to obtain a difference frequency signal for use in the A. F. C. circuits. At microwave frequencies, this mixing is almost always accomplished through the use of a silicon crystal detector, which is the most suitable for the purpose. However, the maximum power output of such a crystal detector is quite limited and it has also been found that the non-linearity of the crystal produces harmonics of the difference frequency which may cause interference with the proper operation of the A. F. C. circuit.

In accordance with my invention, these difficulties are overcome, and improved operation is secured by eliminating the separate A. F. C. crystal detector entirely and by accomplishing the mixing within the resonant cavity in the local oscillator tube itself. Very briefly, this is accomplished by feeding a portion of the transmitter power directly into the local oscillator cavity. I have discovered that a frequency component is thereby introduced into the beam current at the difference frequency between the transmitter frequency and the local oscillator frequency, so that a resonant circuit, tuned to the difference frequency and placed in series with either the reflector anode or the cathode of the oscillator tube, will have the desired difference frequency voltage developed across its terminals. This voltage may then be utilized in any suitable A. F. C. control circuit for the oscillator.

It is therefore a primary object of my invention to provide a new and simplified detector and automatic frequency control circuit for a superheterodyne microwave receiver employing a local oscillator of the velocity-modulation, or cavity, type.

Another object of my inventon is to provide a simplified A. F. C. system for a microwave receiver which eliminates certain circuit elements heretofore believed necessary.

For additional objects and advantages, and for a better understanding of my invention, attention is now directed to the following description and accompanying drawing. The features of my invention which are believed to be novel are particularly pointed out in the appended claims.

Figure 1:
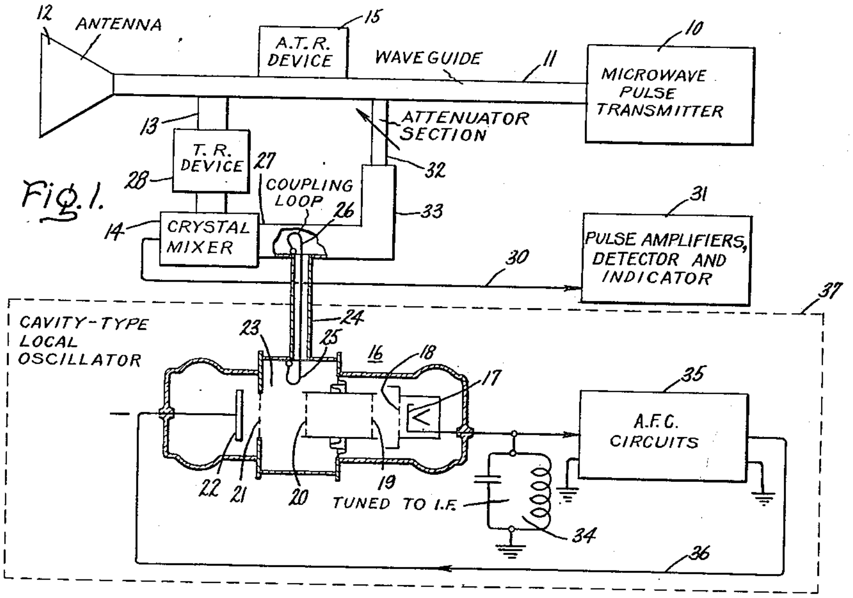
Fig. 1 is a schematic diagram, in which conventional circuit components are indicated in simplified block form, of a microwave pulse radar system embodying the invention.

In Fig. 1 the invention is schematically shown in its application to a microwave pulse radar system. Pulses of microwave energy, for example having a frequency of 3000 megacycles per second, are generated in conventional manner in a microwave pulse transmitter 10 and are transmitted through a waveguide 11 to a suitable directional antenna 12. Antenna 12 is diagrammatically illustrated as being of the horn type. As is well understood by those skilled in the art, remote reflecting objects will cause echoes of the transmitted pulses to be reflected or reradiated back to the antenna 12. The received pulses are supplied from antenna 12 through a portion of waveguide 11 and a waveguide 13 to the first detector of a superheterodyne pulse receiver. This detector is conventionally represented in Fig. 1 as a crystal mixer 14. In order to protect the delicate receiver crystal from the intense transmitted pulses, the usual anti-transmit-receive (A. T. R.) device 15 is employed in waveguide 11 and transmit-receive (T. R.) device 28 in waveguide 13.

The local oscillator of the receiver comprises a velocity-modulation tube 16, represented conventionally in Fig. 1 as a reflex klystron having an electron-emitting cathode 17, beam-forming and focusing electrodes 18 and 19, cavity grids 20 and 21, and reflector, or repeller, electrode 22. The details of construction and operation of this type of tube are well known to those skilled in the art and form no part of the present invention. For additional details of a suitable oscillator tube, reference may be made for example to Patent 2,454,970, issued November 30, 1948, to J. W. Lafferty and assigned to the same assignee as the present invention. Very briefly, when proper operating voltages are applied to the various electrodes, continuous ultra-high frequency oscillations are maintained within the cavity resonator 23 between the electrodes 20 and 21. These oscillations are shown as being supplied to the crystal mixer 14 through a short section of coaxial transmission line 24. One end of the line 24 terminates in a coupling loop 25 within the cavity 23 and the other end terminates in a similar coupling loop 26 within another section of waveguide 27 feeding the crystal mixer 14.

When the frequency of local oscillator 16 is adjusted so as to differ from that of the transmitter 10 by a desired intermediate frequency, for example 30 megacycles, the received oscillations are heterodyned with those from the local oscillator to produce the intermediate frequency signal which is supplied over conductor 30 to the remaining elements of the pulse receiver. Since these elements may also be entirely conventional, and since their details form no part of my invention, they are also merely indicated schematically by the block 31, and may include the usual intermediate frequency amplifier, second detector, video amplifiers and pulse indicator.

It is well known that the operating frequency of a cavity-type local oscillator, such as the reflex klystron 16, may be varied over a range by varying the voltage on one of the control electrodes, preferably the reflector electrode 22. As pointed out earlier in this specification, it has heretofore been the practice to control the local oscillator frequency, so as to maintain the desired intermediate frequency, by mixing a portion of the local oscillator energy with the transmitted energy in a separate crystal detector, and utilizing the detector output to control an A. F. C. voltage applied to the frequency control electrode of the oscillator. However, in accordance with my invention, I couple a small amount of the transmitter energy directly into the oscillator cavity. As shown schematically in Fig. 1, this energy is extracted from the waveguide 11 through a waveguide attenuator section 32 and is supplied to the local oscillator cavity through a waveguide section 33, coupling loop 26, transmission line 24 and coupling loop 25. Those skilled in the art will understand without further detailed explanation that the electrical lengths of the various waveguides are suitably adjusted so that this transmitter energy is cancelled out at the receiver crystal 14.

I have found that when a portion of the transmitter power is thus coupled directly into the local oscillator cavity, the fields thereby set up have an effect upon the motion of the electrons in the electron beam. The relationship between these fields and the beam current is apparently non-linear, since it has been demonstrated that difference frequency components are thereby introduced into the beam current. The desired difference frequency may therefore be very simply derived across a tuned circuit energized from the beam current. As shown in Fig. 1, this circuit consists of the parallel-resonant circuit 34 which is included between the cathode return circuit of oscillator 16 and ground.

The difference frequency oscillations developed across tuned circuit 34 are utilized in any suitable known form of A. F. C. control circuit, represented schematically in Fig. 1 by the block 35, to produce a negative unidirectional control potential. This potential is represented as being supplied over conductor 36 to the reflector electrode 22 and is adjusted in magnitude and polarity so that any tendency for the difference frequency to vary is compensated by a change in the reflector electrode voltage which varies the oscillator frequency in the proper sense. For details of suitable A. F. C. circuits, reference may be made to copending application Serial No. 651,944, filed March 4, 1946, by Jack L. Schultz, and assigned to the same assignee as the present invention. Many other suitable forms of A. F. C. circuits are also extensively described in the literature.

Figure 2:
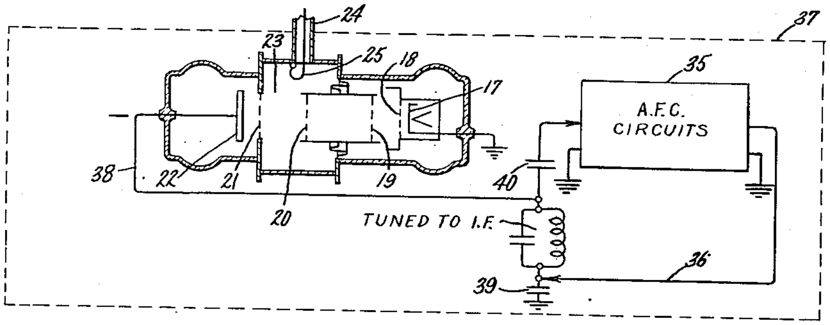
Fig. 2 illustrates a modification of that portion of the embodiment of Fig. 1 enclosed within the dashed rectangle.

Fig. 2 represents a modification of that portion of Fig. 1 within the dashed rectangle 37, in which the difference frequency energy is developed across a tuned circuit which is connected in series with the reflector electrode 22 rather than with the cathode 17. In this modification, the cathode 17 is grounded and a reflector electrode 22 grounded for alternating currents through a conductor 38, the parallel resonant circuit 34 and a blocking capacitor 39. The difference frequency voltages developed across the tank circuit 34 are supplied to the A. F. C. circuit 35 through a blocking capactor 40. The A. F. C. control potential is supplied to the reflector electrode 22 in essentially the same manner as in Fig. 1, through conductor 36, the inductance of tank circuit 34 and conductor 38.

Figure 3:
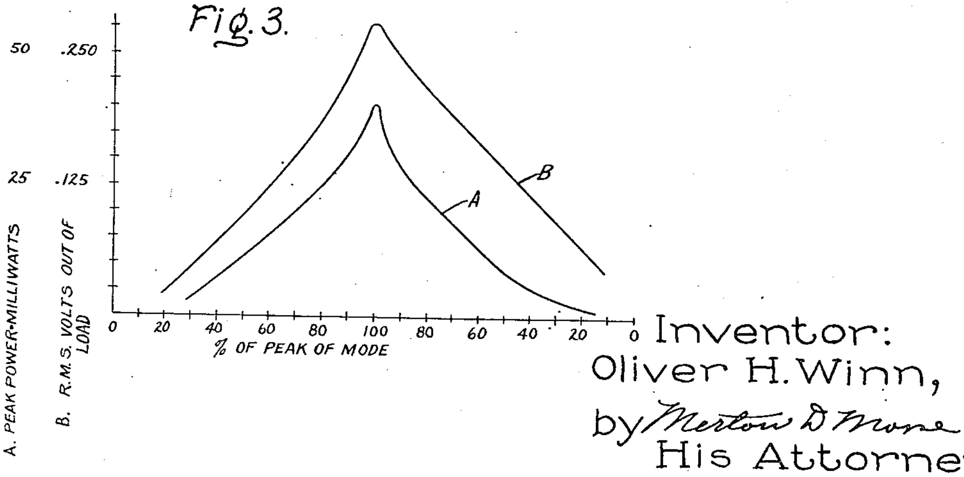
Fig. 3 is a graphical representation of certain electrical operating characteristics of the circuit of Fig. 1.

Fig. 3 is a graph of illustrative test data taken on a particular radar system of the type illustrated in Fig. 1. As the local oscillator klystron was operated off the peak of its mode, it was found that the amount of input microwave power required to saturate it decreased. Curve A in Fig. 3 shows the variation in input peak power required to saturate a particular tube as it was operated at different frequencies, expressed in terms of the percent of peak of the mode. For this particular tube, the power required to saturate it varied from about 40 milliwatts peak power at the peak of mode to 1.5 milliwatts peak power at 15% of peak of mode.

Curve B in Fig. 3 represents the corresponding variation in output root-mean-square volts, at the difference frequency, across the tuned circuit 34 and its output load. It will be observed that, for this particular tube, the voltage output varied from approximately .3 volts at peak of mode to .04 volt at 15% of peak of mode. When two different values of resistance (i. e., 2000 ohms and 1000 ohms) were selectively placed across the 30-megacycle tuned circuit 34, to simulate an output load, the higher-valued resistor gave a higher output voltage. This therefore showed that the local oscillator tube exhibited the characteristics of a relatively high-impedance detector source.

Considerable variation was observed in tests on different klystrons, but in all cases it was determined that at least .1 volt R. M. S. output at the difference frequency could be obtained by properly adjusting the peak power input to the cavity and the point on the mode where the local oscillator tube was operating. Frequency stability of the A. F. C. circuit has also been found to be excellent.

It will thus be seen that I have provided an improved detector and A. F. C. system for microwave receivers, which eliminates the separate A. F. C. crystal mixer heretofore required.

While certain specific embodiments of my invention have been shown and described, it will, of course, be understood that various other modifications may be made without departing from the principles of my invention. The appended claims are therefore intended to cover any such modifications within the true spirit and scope of the invention.

What I claim as new and desire to secure by Letters Patent of the United States is:

1. In an ultra-high frequency superheterodyne receiver of the type including a local oscillator of the velocity modulation type having a single resonant cavity and an anode-cathode circuit, said oscillator having a frequency-control electrode and operating at an ultra-high frequency capable of being controlled by a unidirectional voltage on said electrode so as to differ from a reference frequency by a desired difference frequency, the combination of means for coupling voltage of said reference frequency into said cavity, means comprising a resonant circuit in said anode-cathode circuit for detecting current of the difference frequency produced by interaction of said ultra-high and reference frequencies in said oscillator, means comprising an automatic frequency control circuit for developing a unidirectional control voltage, and means for impressing said control voltage on said electrode in a sense tending to cause said oscillator to maintain said desired difference frequency.

2. In an ultra-high frequency superheterodyne receiver, a local oscillator of the velocity modulation type including a single resonant cavity, a cathode electrode and a reflector electrode, said oscillator having an ultra-high operating frequency capable of being controlled by the voltage on said reflector electrode so as to differ from a reference frequency by a desired intermediate frequency, means for coupling voltage of said reference frequency into said cavity, a tuned circuit resonant at said desired intermediate frequency connected in circuit with one of said electrodes, automatic frequency control means energized from the voltage across said tuned circuit for developing a unidirectional control voltage, and means for impressing said control voltage on said reflector electrode to stabilize said intermediate frequency.

3. In a microwave pulse radar system including a pulse transmitter and a superheterodyne pulse receiver, a local oscillator for said receiver of the reflex klystron type including a cathode electrode, a single resonant cavity and a reflector electrode, means for coupling a small amount of microwave voltage directly from said transmitter into said cavity, a tuned circuit resonant at a desired intermediate frequency connected in circuit with one of said electrodes, an automatic frequency control circuit energized from voltage appearing across said tuned circuit for producing a unidirectional control voltage, and means for impressing said control voltage on said reflector electrode in a sense tending to stabilize said oscillator frequency so as to maintain the difference between the transmitter and oscillator frequencies equal to said desired frequency.

OLIVER H. WINN.

References Cited in the file of this patent

UNITED STATES PATENTS

| Number | Name | Date |
|---|---|---|
| 2,190,515 | Hahn | Feb. 13, 1940 |
| 2,414,100 | Hansen et al. | Jan. 14, 1947 |
| 2,414,843 | Varian et al. | Jan. 28, 1947 |
| 2,425,013 | Stotz | Aug. 5, 1947 |
| 2,536,051 | Frank et al. | Jan. 2, 1951 |